United States Patent
Sugino et al.

(10) Patent No.: US 8,200,851 B2
(45) Date of Patent: Jun. 12, 2012

(54) REMOTE CONSOLE UNIT AND REMOTE DISPLAY APPARATUS

(75) Inventors: Heiichi Sugino, Shinagawa (JP); Takashi Sato, Shinagawa (JP); Fujio Seki, Shinagawa (JP); Masato Ozawa, Shinagawa (JP)

(73) Assignee: Fujitsu Component Limited, Tokyo (JP)

(*) Notice: Subject to any disclaimer, the term of this patent is extended or adjusted under 35 U.S.C. 154(b) by 979 days.

(21) Appl. No.: 11/455,723

(22) Filed: Jun. 20, 2006

(65) Prior Publication Data

US 2006/0290813 A1 Dec. 28, 2006

(30) Foreign Application Priority Data

Jun. 28, 2005 (JP) ................... 2005-188970
Feb. 20, 2006 (JP) ................... 2006-042362

(51) Int. Cl.
*G06F 3/00* (2006.01)
(52) U.S. Cl. .......................................................... 710/2
(58) Field of Classification Search ....................... 710/2
See application file for complete search history.

(56) References Cited

U.S. PATENT DOCUMENTS

| | | | |
|---|---|---|---|
| 5,305,203 A | 4/1994 | Raab | |
| 6,212,584 B1* | 4/2001 | Nei | 710/72 |
| 6,225,984 B1* | 5/2001 | Crawford | 345/173 |
| 6,265,951 B1* | 7/2001 | Kirshtein | 333/28 R |
| 6,501,792 B2* | 12/2002 | Webster | 375/232 |
| 7,102,691 B2* | 9/2006 | Dischert et al. | 348/552 |
| 7,274,405 B2* | 9/2007 | Mori et al. | 348/484 |
| 2002/0008692 A1* | 1/2002 | Omura et al. | 345/173 |
| 2003/0071922 A1* | 4/2003 | Gomi et al. | 348/666 |
| 2004/0213456 A1 | 10/2004 | Mori et al. | |
| 2006/0022096 A1* | 2/2006 | Chan et al. | 248/129 |
| 2006/0028791 A1* | 2/2006 | Huang et al. | 361/683 |

FOREIGN PATENT DOCUMENTS

| | | |
|---|---|---|
| JP | 1-280449 | 11/1989 |
| JP | 05-056307 | 3/1993 |
| JP | 8235093 | 9/1996 |
| JP | 2000-165968 | 6/2000 |
| JP | 2000-174086 | 6/2000 |
| JP | 2004-185113 | 7/2004 |
| JP | 2004-328661 | 11/2004 |
| JP | 2004-337443 | 12/2004 |

OTHER PUBLICATIONS

Japanese Office Action mailed Aug. 31, 2010 in corresponding Japanese Patent Application No. 2006-042362.
Japanese Office Action mailed Nov. 9, 2010 in respect to corresponding Japanese patent application No. 2006-042362.

* cited by examiner

*Primary Examiner* — Eron J Sorrell
*Assistant Examiner* — Dayton Lewis-Taylor
(74) *Attorney, Agent, or Firm* — Staas & Halsey LLP

(57) ABSTRACT

A remote console unit includes a signal processing apparatus that receives an image signal from a computer main body and also sends and receives various signals other than the image signal to and from the computer main body through a cable for general purpose. Data input and/or output can be performed remotely to and from the computer main body through the cable.

5 Claims, 6 Drawing Sheets

REMOTE CONSOLE UNIT AND REMOTE DISPLAY APPARATUS

BACKGROUND OF THE INVENTION

1. Field of the Invention

This invention generally relates to a remote console unit, which enables data input and output to and from a computer main body remotely.

2. Description of the Related Art

A computer system is basically composed of a display apparatus, an input/output apparatus (also known as console), a computer main body, and the like. The display apparatus includes a liquid crystal panel and the like, the input/output apparatus includes a keyboard, mouse, and the like, and the computer main body includes a processor, a memory apparatus, and the like. Conventionally, when a computer system is moved to use in a different place, for example, when the computer system is used at a presentation on a conference or the like, at a reception of a hospital or office, in a manufacturing plant, or the like, respective components that constitute the computer system are accommodated in a rack or the like for movement. For this reason, there has been a demand for the technique of operating a computer main body remotely, and there have been a large number of proposals for operating the computer main body remotely, as disclosed, for example, in Japanese Patent Application Publication No. 08-235093.

The above-described technique, however, utilizes a communication tool such as a network system or the like, thereby causing a time lag to display an image or the like. Therefore, it is not suitable for using the computer system in the above-described places.

SUMMARY OF THE INVENTION

The present invention has been made in view of the above circumstances and provides a remote console unit and a remote display apparatus, where only an input/output apparatus of a computer such as a display apparatus or keyboard (console portion) can be moved to a remote place, and also can be consolidated and downsized.

According to one aspect of the present invention, preferably, there is provided a remote console unit including a signal processing apparatus that receives an image signal from a computer main body and also sends and receives various signals other than the image signal to and from the computer main body through a cable for general purpose. Data input and/or output can be performed remotely to and from the computer main body through the cable. According to the above-described configuration, the remote console unit is configured to include the image signal processing apparatus such that not only the image signal but also the various signals can be sent and received to and from the computer main body. It is therefore possible to move the console portion of the computer separately and freely from the computer main body, thereby operating the computer main body remotely.

According to another aspect of the present invention, preferably, there is provided a remote display apparatus including: an image receiving portion that receives an image signal from a computer main body through a cable for general purpose; and a transmitting and receiving portion that sends and receives various signals other than the image signal to and from the computer main body through the cable. The image signal can be displayed, after receiving at a place separated from the computer main body from the computer main body through the cable.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

Figure 1:
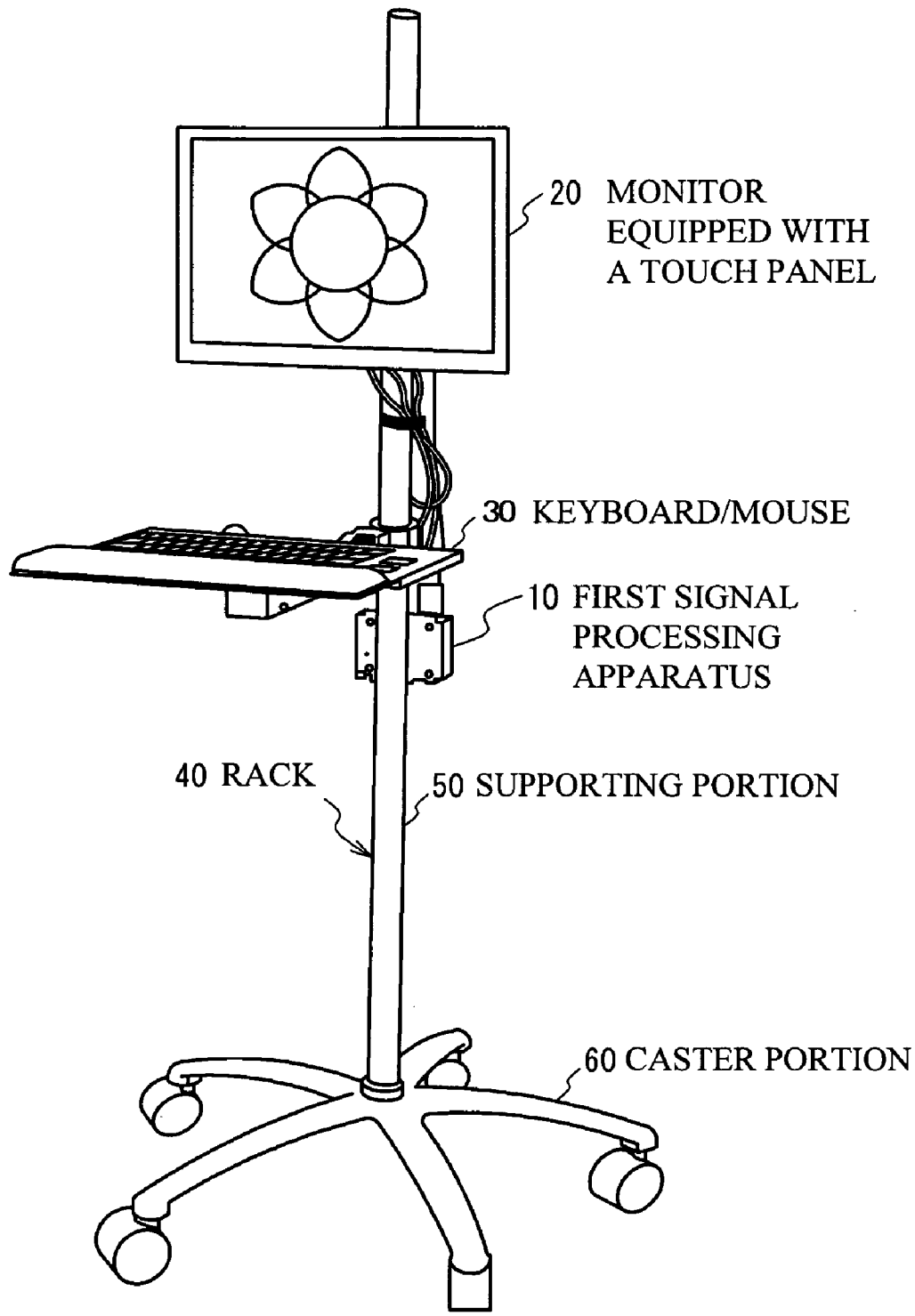
FIG. 1 is an external perspective view of a remote console unit of a computer in accordance with an exemplary embodiment of the present invention.
Figure 2:
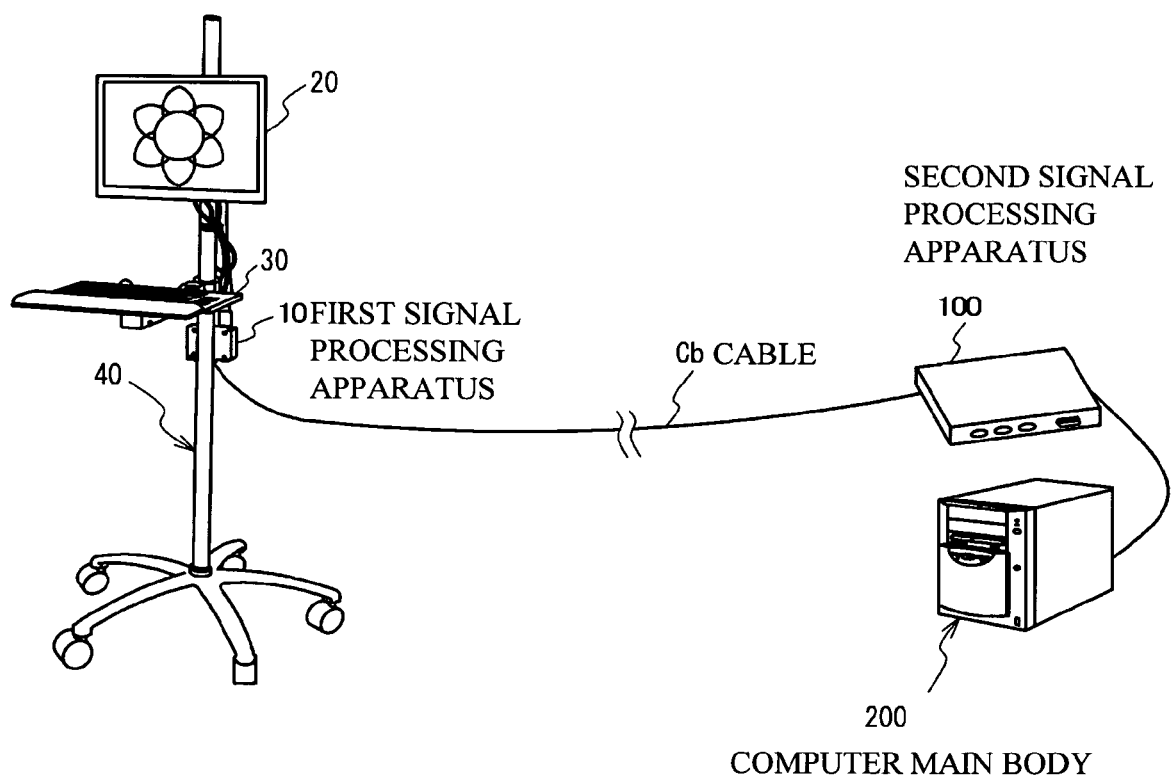
FIG. 2 is a view illustrating the remote console unit connected to a computer main body by a cable.
Figure 3:
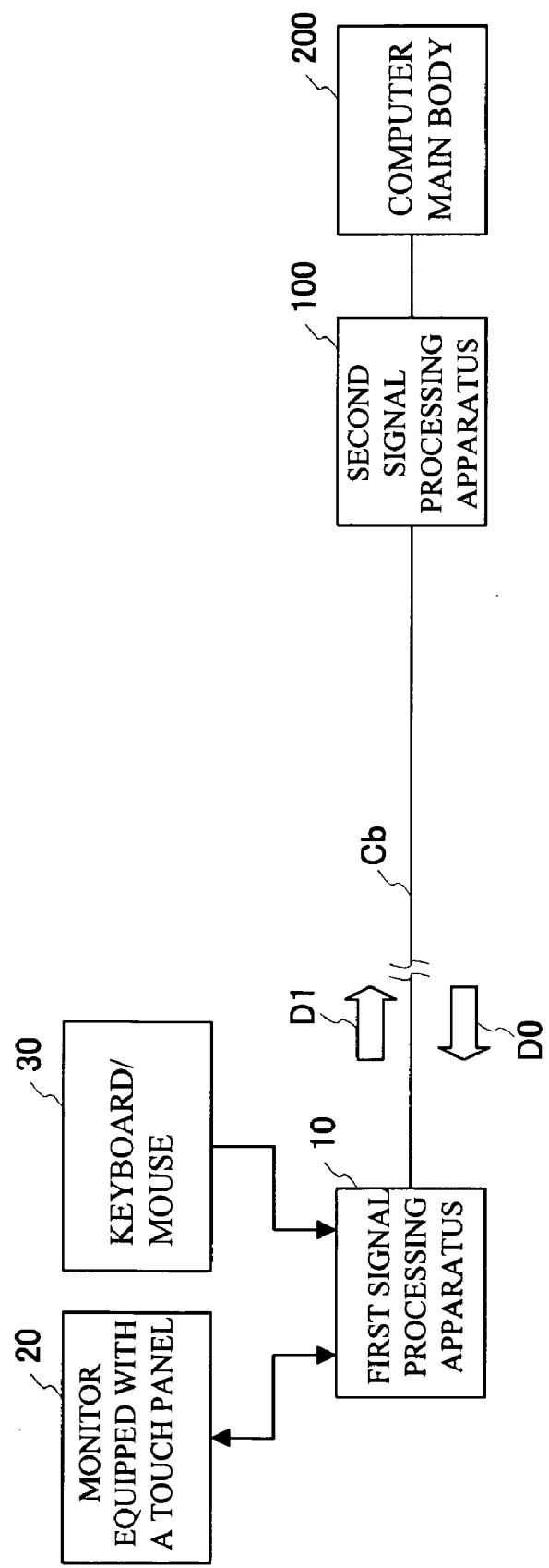
FIG. 3 is a functional block diagram of a computer system to which the remote console unit employed in accordance with an exemplary embodiment is applied.
Figure 4:
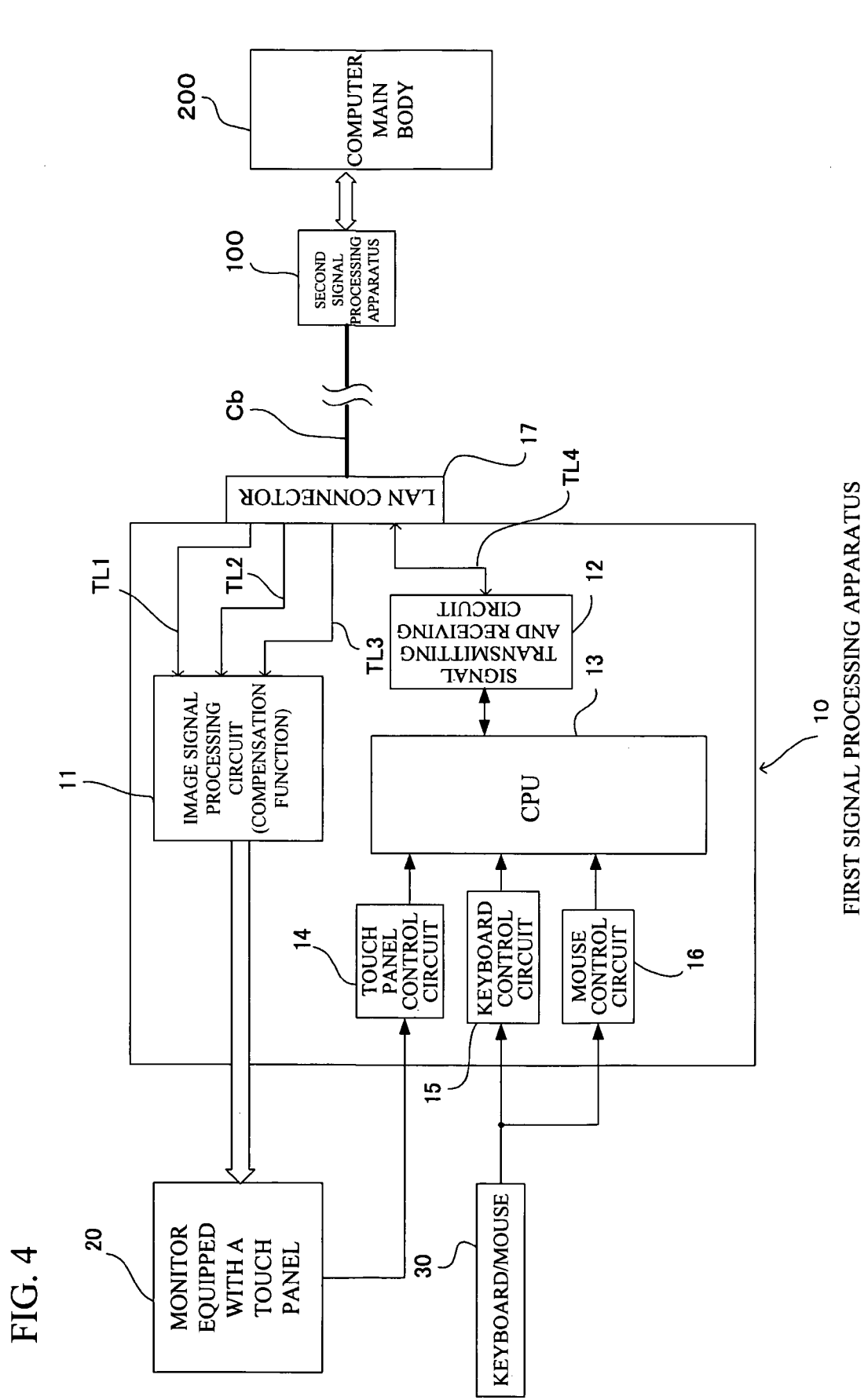
FIG. 4 is a functional block diagram of a signal processing portion equipped in the console unit.

A description will be given of an exemplary embodiment of the present invention, with reference to FIG. 1 through FIG. 4. FIG. 1 is an external perspective view of a remote console unit of a computer in accordance with an exemplary embodiment of the present invention. FIG. 2 is a view illustrating the remote console unit connected to a computer main body by a cable. FIG. 3 is a functional block diagram of a computer system to which the remote console unit employed in accordance with an exemplary embodiment is applied. FIG. 4 is a functional block diagram of a signal processing apparatus equipped in the console unit.

The remote console unit, as shown in FIG. 1 through FIG. 4, includes a first signal processing apparatus 10, a monitor 20, a keyboard 30, a rack 40, and the like. The monitor 20 is equipped with a touch panel, and serves as a display apparatus. The keyboard 30 is provided with mouse functionality, and serves as an input apparatus. Hereinafter, the keyboard 30 used in the present invention is referred to as keyboard/mouse 30.

The monitor 20 displays various kinds of data such as image data that has been sent from a computer main body 200 or the like and input from the first signal processing apparatus 10, on a display screen thereof, and also outputs touch input data of the touch panel formed onto the display screen, to the computer main body 200 through the first signal processing apparatus 10. The monitor 20 functions as an input/output apparatus. In addition, the touch panel may employ a resistive touch method, analog capacitive coupling method, infrared method, ultrasonic method, or the like.

The keyboard/mouse 30 is operated by a user existing on the side of the remote console unit, and data corresponding to key operation or mouse operation is input into the first signal processing apparatus 10.

The first signal processing apparatus 10, as shown in FIG. 2, is electrically coupled to the computer main body 200 via a second signal processing apparatus 100 by a cable Cb, one end of which is connected by the second signal processing apparatus 100. The first signal processing apparatus 10 sends various signals DI to the computer main body 200 by means of the second signal processing apparatus 100 and the cable Cb, and also receives various signals DO such as image signals or the like from the second signal processing apparatus 100 through the cable Cb. The first signal processing apparatus 10, as shown in FIG. 4, includes an image signal processing circuit 11, a signal transmitting and receiving circuit 12, a CPU 13 serving as a processor, a touch panel control circuit 14, a keyboard control circuit 15, a mouse control circuit 16, a LAN connector 17, and the like.

A cable for general purpose, for example, a Local Area Network (LAN) cable is employed for the cable Cb. As a LAN cable, there may be employed an Unshielded Twisted Pair (UTP) cable, which is composed of four twisted pair cables (transmission lines) classified as category 5 (Cat 5) or category 6 (Cat 6) defined in Electronics Industries Alliance/Telecommunications Industry Association (EIA/TIA) 569 standard. In addition, there may be employed another type of LAN cable corresponding to the category 5 or category 6 defined in another standard (examples are ISO11801, JISX5150, and IEEE 802.3). Furthermore, there may be employed a LAN cable of enhanced category 5 (Cat 5e). The cable Cb is equipped with modular plugs (not shown) of, for example, Registered Jack-45 (RJ-45) on both ends thereof. One modular plug is connected to the LAN connector 17 of the first signal processing apparatus 10, and the other is connected to a LAN connector (not shown) of the second signal processing apparatus 100 provided on the side of the computer main body 200. When the above-described LAN cable is employed for the cable Cb, a length of the cable Cb can be extended to approximately several hundred meters.

Referring now to FIG. 4, image signals (R, G, and G signals) are respectively input into the image signal processing circuit 11 through three transmission lines TL1 through TL3 of the cable Cb. The image signals input into the image signal processing circuit 11 have a large difference in the signal delay time among R, G, and B signals as the length of the cable Cb becomes longer, thereby degrading frequency characteristics of R, G, and B signals and attenuating gains of R, G, and B signals. For this reason, the image signal processing circuit 11 has functions of compensating for characteristic degradation of R, G, and B signals in relation to such extended cable Cb. Specifically, the functions are a gain adjusting function of R, G, and B signals, a signal delay time adjusting function among R, G, and B signals, and a frequency characteristics adjusting function of R, G, and B signals. Here, the afore-described compensation functions can be realized by known techniques. The image signal processing circuit 11 compensates for the characteristics of the image signals received from the second signal processing apparatus 100 provided on the side of the computer main body 200 through the cable Cb, and then outputs on the monitor 20. This enables a high-quality image to be displayed on the monitor 20, even if the cable Cb is extended.

The touch panel control circuit 14 is equipped with, for example, a serial interface to receive an input signal (which may be a serial signal) from the touch panel included in the monitor 20 and output to the CPU 13. The keyboard control circuit 15 receives a keyboard signal (which may be a serial signal) input by keyboard operation with the use of the keyboard/mouse 30, and outputs to the CPU 13. The mouse control circuit 16 receives a mouse signal (which may be a serial signal) input by mouse operation with the use of the keyboard/mouse 30, and outputs to the CPU 13. The CPU 13 outputs various signals input from the touch panel control circuit 14, the keyboard control circuit 15, and the mouse control circuit 16, to the signal transmitting and receiving circuit 12. The signal transmitting and receiving circuit 12 sends and receives various signals through the second signal processing apparatus 100 provided on the side of the computer main body 200 and the transmission lines TL of the cable Cb, and multiplexes the various signals that have been input from the CPU 13 to send to the computer main body 200 by means of a commonly provided transmission line TL4. Here, the signal transmitting and receiving circuit 12 has a function of compensating for signal degradation associated with the extension of the cable Cb.

The second signal processing apparatus 100 is a dedicated apparatus that is formed in accordance with the first signal processing apparatus 10 in connection with the computer main body 200, and is capable of sending and receiving image signals and other various signals to and from the first signal processing apparatus 10.

The rack 40 is made, for example, of steel, and is composed of a column portion 50 and a caster portion 60, and the like. The caster portion 60 supports a bottom portion of the column portion 50, and also makes the remote console unit movable.

The column portion 50 supports the monitor 20, the keyboard/mouse 30, and the first signal processing apparatus 10, by means of an attachment, not shown, in such a manner that the monitor 20, the keyboard/mouse 30, and the first signal processing apparatus 10 are attachable. Positions of the monitor 20, the keyboard/mouse 30, and the first signal processing apparatus 10 are adjustable along the column portion 50. Therefore, the user is able to adjust heights of the monitor 20, the keyboard/mouse 30, the first signal processing apparatus 10, and the like. This allows the user to operate the computer both at a standing position and at a sitting position. The monitor 20, the keyboard/mouse 30, and the first signal processing apparatus 10 are respectively supported by the column portion 50, so that the monitor 20 and the keyboard/mouse 30 can be wired with the first signal processing apparatus 10 with great ease.

As stated heretofore, in accordance with an exemplary embodiment of the present invention, the input and/or output of the various signals to and from the computer main body 200 is controlled by the first signal processing apparatus 10, thereby allowing the image signal sent from the computer main body 200 to be displayed on the monitor 20 in high quality. Also, it is possible to remotely operate the computer main body 200 with the use of various input apparatuses such as the keyboard/mouse 30, touch panel, and the like. In addition, in accordance with an exemplary embodiment of the present invention, the computer main body 200 and the remote consol unit are connected by means of only a single LAN cable, thereby making it possible to move the remote console unit away from the computer main body 200 separately and freely. For example, it is possible to install the computer main body 200 in a given room and operate the remote console unit in a different place or room.

Figure 5:
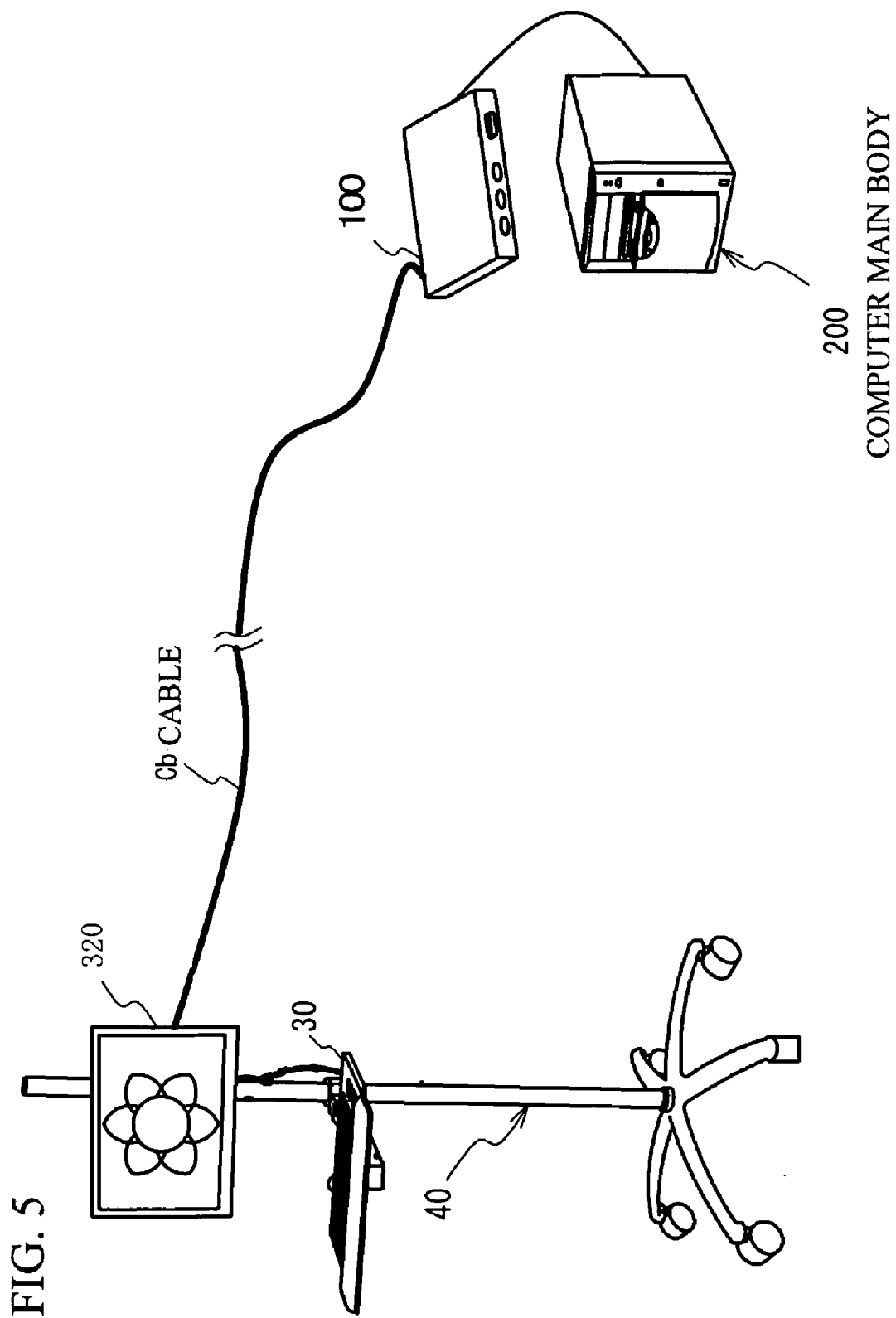
FIG. 5 is a view illustrating a remote display apparatus connected to the computer main body by a cable in accordance with another exemplary embodiment of the present invention.
Figure 6:
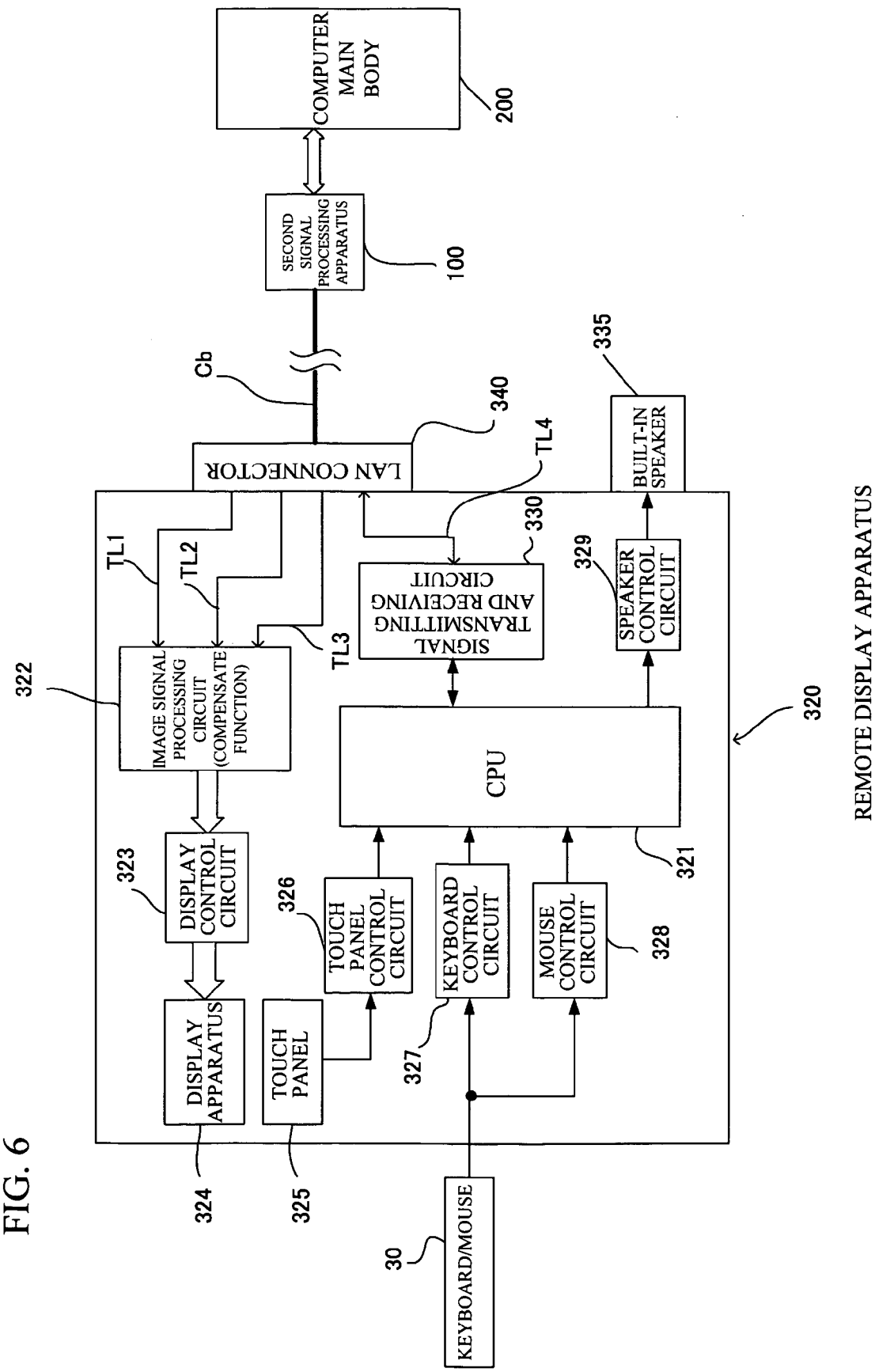
FIG. 6 is a functional block diagram of the remote display apparatus.

Next, a description is given of a remote display apparatus in accordance with another exemplary embodiment of the present invention, by reference to FIG. 5 and FIG. 6. FIG. 5 is a view illustrating the remote display apparatus connected to the computer main body by a cable in accordance with another exemplary embodiment of the present invention. FIG. 6 is a functional block diagram of the remote display apparatus. Hereinafter, in the present exemplary embodiment, the same components and configurations as those of the above-described embodiment have the same reference numerals. A remote display apparatus 320 is connected by a keyboard/mouse 30, as shown in FIG. 5. The remote display apparatus 320 is composed of a processor (CPU) 321, an image signal receiving circuit 322, a display control circuit 323, a display apparatus 324, a touch panel 325, a touch panel control circuit 326, a keyboard control circuit 327, a mouse control circuit 328, a speaker control circuit 329, a signal transmitting and receiving circuit 330, a built-in speaker 335, a LAN connector 340, and the like, as shown in FIG. 6.

The image signal receiving circuit 322, in a similar manner as the above-described image signal processing circuit 11, compensates for the characteristic of the image signal received from the second signal processing apparatus 100 provided on the side of the computer main body 200 through the cable Cb, and then outputs such compensated image signal to the display control circuit 323. The display control circuit 323 performs display control of the display apparatus 324 on the basis of the image signal obtained from the image signal receiving circuit 322.

The display apparatus 324 is composed, for example, of a liquid crystal panel or the like, and the touch panel 325 is provided on a front surface thereof. An identical touch panel to the above-described one may be employed for the touch panel 325.

The touch panel control circuit 326 receives an input signal (which may be a serial signal) from the touch panel 325, and then outputs the input signal to the processor 321. The keyboard control circuit 327 receives a keyboard signal (which may be a serial signal) input according to keyboard operation of the keyboard/mouse 30, and then outputs the keyboard signal to the processor 321. The mouse control circuit 328 receives a mouse signal (which may be a serial signal) input according to keyboard operation of the keyboard/mouse 30, and outputs the keyboard signal to the processor 321.

The speaker control circuit 329 outputs a sound signal that has been received from the computer main body 200 through the second signal processing apparatus 100, the cable Cb, the LAN connector 340, the signal transmitting and receiving circuit 330, and the processor 321, to the built-in speaker 335. The built-in speaker 335 is built in the remote display apparatus 320, and outputs the sound signal fed from the speaker control circuit 329.

The processor (CPU) 321 outputs various signals input from the touch panel control circuit 326, the keyboard control circuit 327, and the mouse control circuit 328 to the signal transmitting and receiving circuit 330, and also outputs the sound signal fed from the signal transmitting and receiving circuit 330 to the speaker control circuit 329.

The signal transmitting and receiving circuit 330 is a circuit provided for sending and receiving various signals to and from the second signal processing apparatus 100 provided on the side of the computer main body 200, through a transmission line TL of the cable Cb. The signal transmitting and receiving circuit 330 multiplexes the various signals input from the processor (CPU) 321 to the computer main body 200 with the use of the commonly provided transmission line TL4. The signal transmitting and receiving circuit 330 has a function of compensating for signal degradation associated with the extension of the cable Cb.

The remote display apparatus 320 configured as described above allows the user to perform a remote operation on the computer main body 200 at a place separated from the computer main body 200, with the use of the keyboard/mouse 30 and the touch panel 325, while the user is watching a high-quality image being displayed on the display apparatus 324. In addition, the remote display apparatus 320 internally has a function of receiving the image signal from the computer main body 200, a function of compensating for characteristics of the signal associated with the extension of the cable, and a function of sending and receiving the various signals of the keyboard/mouse 30 and a touch panel 25, and the like. Accordingly, the remote display apparatus 320 is downsized and excellent at mobility, thereby making it possible to carry to a required place with ease. In addition, by connecting the single cable Cb to the LAN connector 340, it is possible to operate the computer main body 200 and display the image immediately.

In the above-described embodiments, the description has been given of the case where the first signal processing apparatus 10, the monitor 20, and the keyboard/mouse 30 are supported by the rack 40. However, the configuration is not limited to the above-described case. The configuration that does not use the rack 4 may be employed, and the configuration of the rack 4 may be varied accordingly.

In the above-described embodiments, the description has been given of the monitor 20 equipped with a touch panel, the keyboard/mouse 30, the speaker 335, the touch panel 326, and the like, respectively serving as an input/output device. However, the configuration is not limited to the above-described devices. For example, various input/output devices (remote consol units) such as a projector, pointing device, and the like can be connected to the computer main body 200 through the cable Cb.

According to one aspect of the present invention, preferably, there is provided a remote console unit including a signal processing apparatus that receives an image signal from a computer main body and also sends and receives various signals other than the image signal to and from the computer main body through a cable for general purpose. Data input and/or output can be performed remotely to and from the computer main body through the cable.

In the above-described remote control unit, the signal processing apparatus may have a function of compensating for characteristic degradation of the image signal associated with an extension of the cable. With the above-described configuration, it is possible to maintain the image quality to be displayed on the display apparatus, even if the cable is extended and the console portion is installed at a place further separated from the computer main body.

In the above-described remote control unit, the cable may be a LAN cable. In addition, the cable may be a category 5 LAN cable. With the above-described configuration, by use of a standard product of the LAN cable, the costs can be reduced.

The above-described remote control unit may further include a display apparatus connected with the signal processing apparatus and outputting the image signal that has been received from the computer main body, onto a display screen; and an input apparatus provided for inputting data into the computer main body. Also, the input apparatus may include at least any one of a keyboard, a mouse, and a touch panel. With the above-described configuration, in a remote console unit, it is possible to operate the keyboard or the mouse while watching the display screen, in a similar manner as normal computer operation.

The above-described remote control unit may further include a rack that supports the signal processing apparatus, the display apparatus, and the input apparatus. With the above-described configuration, it is possible to consolidate and downsize the remote consol unit.

In the above-described remote control unit, the rack may include a supporting portion that commonly supports the signal processing apparatus, the display apparatus, and the input apparatus. With the above-described configuration, the signal processing apparatus, the display apparatus, and the input apparatus are supported by a commonly provided supporting portion, thereby making it possible to connect among the signal processing apparatus, the display apparatus, and the input apparatus by wire with ease. It is therefore possible to further consolidate and downsize the remote console unit.

In the above-described remote control unit, the rack may be movable. With the above-described configuration, the remote console unit can be moved freely according to the need.

In the above-described remote control unit, the signal processing apparatus may send and receive the various signals other than the image signal with the use of one or more common transmission lines except for a transmission line used for sending and receiving the image signal, out of multiple transmission lines included in the cable. With the above-described configuration, it is possible to minimize the number of the transmission lines in the cable.

The present invention is not limited to the above-mentioned embodiments, and other embodiments, variations and modifications may be made without departing from the scope of the present invention.

The present invention is based on Japanese Patent Application No. 2005-188970 filed on Jun. 28, 2005 and Japanese Patent Application No. 2006-042362 filed on Feb. 20, 2006, the entire disclosure of which is hereby incorporated by reference.

What is claimed is:

1. A remote console unit comprising:
a signal processing apparatus including:
an image signal processing circuit that receives an image signal from a computer main body through a LAN cable; and
a signal transmitting and receiving circuit that sends and receives various signals other than the image signal to and from the computer main body through the LAN cable;
a display apparatus connected to the signal processing apparatus and outputting the image signal that has been received from the computer main body onto a display screen;
an input apparatus provided for inputting data into the computer main body; and
a rack that includes a column portion and a caster portion;
wherein the column portion commonly supports the signal processing apparatus, the display apparatus, and the input apparatus,
wherein the caster portion supports the bottom portion of the column portion,
wherein the various signals include a sound signal and an operating signal from one or more input apparatus for remotely operating the computer main body, the operating signal from the each input apparatus being a serial signal,
wherein the LAN cable includes at least four transmission lines,
wherein three of the four transmission lines are used to transmit the image signal, and one of the four transmission lines is used to transmit the sound signal and the operating signal multiplexed by the signal transmitting and receiving circuit,
wherein data input and/or output can be performed remotely to and from the computer main body through the LAN cable;
wherein a user of the remote console unit performs a remote operation on the computer main body at a place separated from the computer main body; and
wherein the signal processing apparatus has a function of compensating for a characteristic degradation of the image signal and the various signals including the sound signal and the operating signal associated with an extension of the LAN cable.

2. The remote console unit as claimed in claim 1, wherein the LAN cable is a category 5 LAN cable.

3. The remote console unit as claimed in claim 1, wherein the input apparatus includes at least any one of a keyboard, a mouse, and a touch panel.

4. The remote console unit as claimed in claim 1, wherein the signal processing apparatus sends and receives the various signals other than the image signal with the use of one or more common transmission lines except for a transmission line used for sending and receiving the image signal, out of multiple transmission lines included in the LAN cable.

5. The remote console unit as claimed in claim 1, wherein the signal processing apparatus, the display apparatus, and the input apparatus are adjustable along the column portion.

* * * * *